United States Patent
Saupe

(10) Patent No.: US 7,243,602 B2
(45) Date of Patent: Jul. 17, 2007

(54) DEVICE FOR POSITIONING FURTHER PROCESSING DEVICES ON PRINTING MACHINES

(75) Inventor: Dieter Saupe, Renningen (DE)

(73) Assignee: MAN Roland Druckmaschinen AG, Offenbach am Main (DE)

( * ) Notice: Subject to any disclaimer, the term of this patent is extended or adjusted under 35 U.S.C. 154(b) by 121 days.

(21) Appl. No.: 10/510,425

(22) PCT Filed: Apr. 2, 2003

(86) PCT No.: PCT/EP03/03423

§ 371 (c)(1),
(2), (4) Date: Oct. 6, 2004

(87) PCT Pub. No.: WO03/084752

PCT Pub. Date: Oct. 16, 2003

(65) Prior Publication Data

US 2005/0139111 A1    Jun. 30, 2005

(30) Foreign Application Priority Data

Apr. 9, 2002    (DE) ................. 102 15 611

(51) Int. Cl.
*B41F 13/54*    (2006.01)

(52) U.S. Cl. ........................ 101/480; 101/479

(58) Field of Classification Search ........... 101/216, 101/479, 480, 152, 153, 181; *B41F 13/54, B41F 13/44*
See application file for complete search history.

(56) References Cited

U.S. PATENT DOCUMENTS

| | | | | |
|---|---|---|---|---|
| 3,111,250 A | * | 11/1963 | Dutro et al. | 226/101 |
| 3,384,012 A | * | 5/1968 | Zernov | 101/216 |
| 3,877,370 A | * | 4/1975 | Hantscho | 101/216 |
| 4,046,070 A | * | 9/1977 | Halley | 101/216 |
| 4,239,001 A | * | 12/1980 | Kataoka | 101/152 |
| 4,966,352 A | * | 10/1990 | Nuttin | 270/1.01 |
| 2003/0036468 A1 | * | 2/2003 | Blank et al. | 493/8 |

FOREIGN PATENT DOCUMENTS

| | | |
|---|---|---|
| DE | 1 919 695 | 11/1970 |
| DE | 39 16 254 A1 | 11/1990 |
| DE | G 94 20 690.2 | 3/1995 |
| DE | 195 14 910 C2 | 10/1996 |

* cited by examiner

*Primary Examiner*—Leslie J. Evanisko
(74) *Attorney, Agent, or Firm*—Cohen Pontani Lieberman & Pavane LLP

(57) ABSTRACT

An apparatus for positioning further or auxiliary processing devices, such as folders, cross cutting devices, sheet stackers or roll winding-up systems, on printing presses, includes a first positioning device which interacts with a further positioning device fixed to the floor in such a manner that the further or auxiliary processing device can be positioned in relation to the printing press in a reproducible manner.

5 Claims, 2 Drawing Sheets

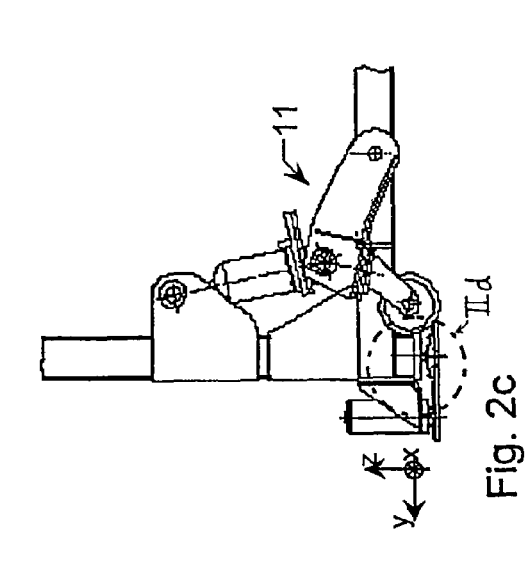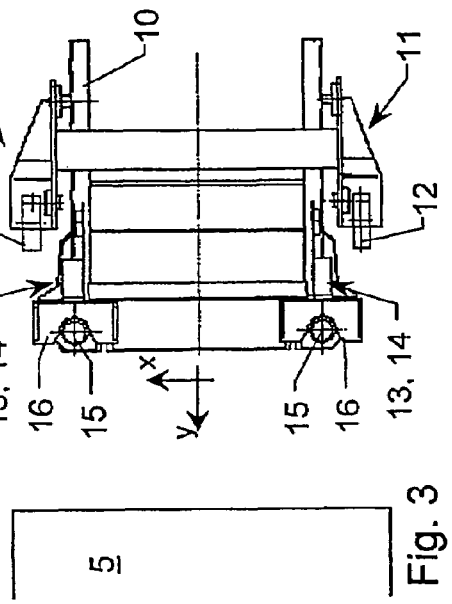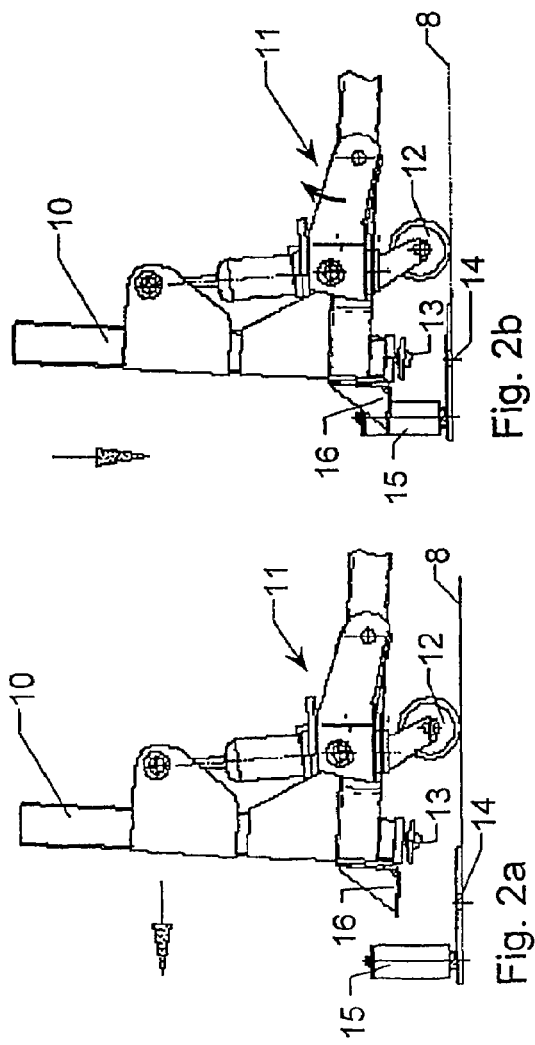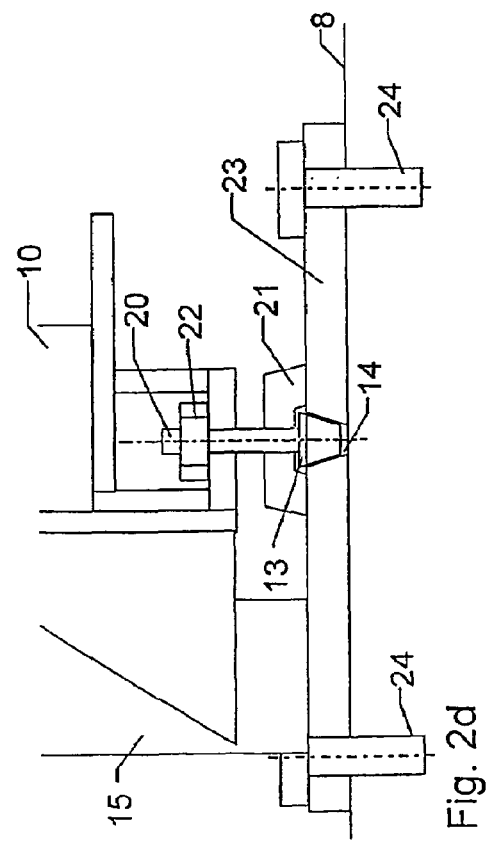

DEVICE FOR POSITIONING FURTHER PROCESSING DEVICES ON PRINTING MACHINES

PRIORITY CLAIM

This is a U.S. national stage of application No. PCT/EP03/03423, filed on 2 Apr. 2003. Priority is claimed on that application and on the following application(s): Country: Germany, Application No.: 102 15 611.5, Filed: 9 Apr. 2002.

BACKGROUND OF THE INVENTION

1. Field of the Invention

The invention relates to an apparatus for positioning further or auxiliary processing devices on printing presses.

2. Description of the Prior Art

In printing presses, it is generally known to provide devices with which the printed products can be processed further. Devices of this type are arranged after the printing line and can, for example, fold a printed web longitudinally and/or transversely, cut it and/or stack the products. Likewise, devices are also known which wind the printed web up again into a roll. Usually, however, printing presses are equipped only with one device of this type and it is only possible to exchange one for another after the printing press has been installed by rebuilding it, which is associated with great installation complexity. As lengthy rebuilding work of this type is not possible between two print jobs, the further processing of the printed products is restricted to the possibilities of the installed devices.

SUMMARY OF THE INVENTION

An object of the invention is to provide an apparatus which makes it possible to exchange further or auxiliary processing devices on printing presses.

According to the invention, this object is achieved by a first positioning device fixed to a further or auxiliary processing device for interacting with a further positioning device fixed to a floor relative to the printing press.

The apparatus according to the invention makes it possible, in an advantageously simple manner, to exchange various further processing devices on a printing press, for example a sheet stacker, folder or roll winding-up means. For this purpose, the invention provides a fixed positioning device on the floor and a further corresponding positioning device on the further processing device, which positioning devices can be brought into engagement with one another and also detached from one another simply. As a result, simple and rapid exchanging is possible, which permits flexible further processing of the printed paper web or other printed products.

It is advantageous to provide a movable frame for each further processing device, using which they can be moved to the printing press simply and the positioning devices can be brought into engagement with one another or detached from one another by a raising/lowering mechanism.

It can be advantageous to provide additional means for fixing the further processing devices on the floor.

Further features and advantages emerge from the sub-claims in conjunction with the description.

BRIEF DESCRIPTION OF THE DRAWINGS

In the drawings: FIGS. 2a, 2b, and 2c are side views of the area II from FIG. 1 as a further processing device is being positioned on a movable frame, FIG. 2d is an enlarged sectional side view of the area IId from FIG. 2c, and FIG. 3 is a plan view of the positioning apparatus from view III in FIG. 1.

DETAILED DESCRIPTION OF THE PREFERRED EMBODIMENTS

Figure 1:
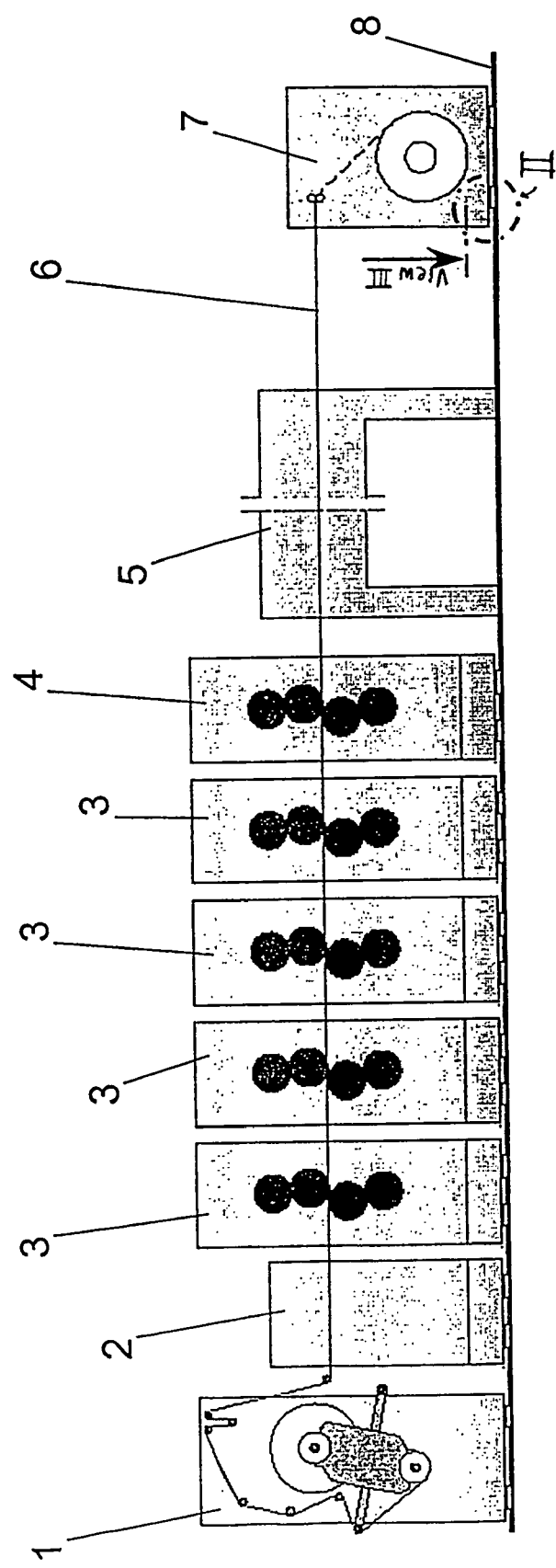
FIG. 1 is a schematic side view of a web-fed printing press having a roll winding-up device positioned in accordance with the invention.

FIG. 1 shows, by way of example, a web-fed printing press, comprising an unwinding device 1, threading unit 2, a plurality of printing units 3, 4 and a dryer 5 for drying the printing material web 6 on which the ink is still wet. In this example, the printing material web 6 is wound onto a roll by a roll winding-up system 7. All the modules are arranged on a preferably flat floor 8. The roll winding-up system 7 is equipped with positioning apparatuses according to the invention and can be exchanged, for example, for a cross cutter having a sheet stacker, or for a folder. In this exemplary embodiment, the further processing devices are arranged on movable frames which can be raised and lowered.

Instead of using a movable frame, the further processing devices may be moved using other lifting gear, such as a machine-house crane, and to position them on the printing press using the positioning apparatus according to the invention.

The details of the positioning apparatus can be seen in FIG. 2a which shows the detail II on an enlarged scale.

FIG. 2a shows a base region of the frame 10, on which the further processing device is arranged, for example a winding-up system, a sheet stacker or a folder. The frame 10 preferably has four contact points which can be lifted by means of lifting apparatuses 11, with the result that the frame 10, together with the further processing device, can be moved on rollers 12. FIG. 2a illustrates the raised position of a contact point while the frame 10 is moved to the printing press (not shown), preferably on steerable rollers 12. U-shaped receptacles 16 can be provided on the frame 10 for prepositioning the further processing device roughly, which receptacles 16 are pushed onto cylindrical bolts 15 fastened to the floor 8 when the frame 10 is moved closer. As can be seen from FIG. 2b, the frame 10 is prepositioned as a result of the receptacles 16 being pushed onto the bolts 15 completely, in such a way that a first positioning device 13 arranged on the frame 10 is situated approximately above a further positioning device 14 which is fixed to the floor 8. The first positioning device 13 preferably has a conical outer contour which, when the frame 10 is lowered, is lowered into the other positioning device 14, which is formed as a conical recess on the floor 8, and therefore positions the frame 10 with the further processing device by means of the form-fitting connection between the inner and outer cone. It is of course also possible to provide other suitable shapes on the positioning devices 13, 14. The bolt 15 and the associated positioning device 14 are preferably arranged on a common plate 23 (FIG. 2d) which is fixed to the floor 8.

The completely lowered frame 10 is shown in FIG. 2c. In this position, the raising/lowering device 11 is completely relieved of load. A hydraulic cylinder is actuated to raise the frame 10, as a result of which the pivotably attached wheel 12 is tensioned against the floor 8 and as a result lifts up the frame 10. A plurality of raising/lowering apparatuses 11 are preferably provided for one frame 10, the former being actuated simultaneously in order that the further processing device is raised or lowered perpendicularly. In accordance with the detail IId from FIG. 2c, the interaction of the positioning devices 13, 14 is shown in FIG. 2d on an enlarged scale.

A plate 23 can be seen in FIG. 2d, the former being fixed to the floor 8 by means of screws 24, having a conical recess 14 and bearing a bolt 15. The conical outer contour 13 is accommodated in the conical recess 14 and therefore defines the position of the contact point in the plane of the floor (in the x-y direction). In order for it to be possible to bring the positioning devices 13 and 14 simply into engagement with one another, the height of the bolt 15 is such that it can be moved to by the receptacle 16 in the raised position and the receptacle 16 can be guided on it during lowering. There can be some play here between the receptacle 16 and bolt 15, because the position of the conical fit of the positioning devices 13, 14 is self-centering.

In order to set a plurality of further processing devices on different frames 10 to a positioning device 14 anchored on the floor 8, the positioning device 13 on the frame 10 can be arranged so as to be adjustable in the horizontal plane (x-y direction). In order for it to be possible to predefine the height (z direction) of the frame 10 and the further processing device, the positioning device 13 can be height-adjustable. For this purpose, in the exemplary embodiment shown, the positioning device 13 is arranged on a threaded bolt 20 which is screwed into an internal screw thread on the frame 10 in accordance with the desired height and is secured with a further nut 22.

A base piece 21 which absorbs the weight of the frame 10 can additionally be provided on the positioning device 13. The base piece 21 has to be arranged in such a way that it absorbs the force as soon as the positioning devices 13, 14 are joined to one another without play. The base piece 21, the positioning device 13 and the threaded bolt 20 can be produced as a single piece or be assembled from a plurality of parts.

FIG. 3 is a plan view, with the view A from FIG. 1, of a frame 10. It is advantageous to provide in each case two positioning devices 13, 14, in order, in addition to the position, to also define the angular orientation of the further processing device in relation to the dryer 5 of the printing press. It can be seen how two receptacles 16 are prepositioned on bolts 15 and how, during lowering, the position and angular orientation of the frame 10 are defined unambiguously by two positioning devices 13, 14 arranged at a distance from one another.

In general, the weight of the further processing device and of the frame 10 ensures reliable stability which is sufficient for operation. However, additional tensioning means can be provided, such as brackets, using which the frame 10 is tensioned against the floor 8 at the contact points.

The essential core of the invention is to be seen in the fact that one or more fixed positioning devices are arranged in relation to a printing press, which positioning devices interact with further positioning devices attached to mobile further processing devices, in such a way that their relative position with respect to the printing press is defined in a reproducible manner. It is possible to provide as many and varied further processing devices as desired with the corresponding positioning devices and to align them with their fixed counterparts, with the result that said further processing devices are positioned on the printing press rapidly and are ready for use in a very short time, without further adjusting effort and other adaptation work.

What is claimed is:

1. An apparatus for positioning an external auxiliary processing device, which comprises one of a folder, a cross-cutting device, a sheet stacker, and a roll winding-up system, relative to a printing press, comprising:
   a first positioning device mounted on the external auxiliary processing device; and
   a further positioning device arranged outside of the printing press and fixed to a floor relative to the printing press, said first positioning device being engagable with said further positioning device such that the external auxiliary processing device is reproducibly positionable at an operating position in relation to the printing press, wherein said first positioning device comprises a conical outer contour and said further positioning device has a complementary conical recess for engagably receiving said conical outer contour.

2. The apparatus of claim 1, wherein the auxiliary processing device has one of a mobile frame and lifting gear for providing mobility to the external auxiliary processing device.

3. The apparatus of claim 1, wherein said first positioning device further comprises a base piece for supporting the weight of the external auxiliary processing device when said first positioning device engages said further positioning device.

4. The apparatus of claim 1, wherein two first positioning devices are arranged on the external auxiliary processing device corresponding to two further positioning devices mounted on the floor.

5. An apparatus for positioning an external auxiliary processing device, which comprises one of a folder, a cross-cutting device, a sheet stacker, and a roll winding-up system, relative to a printing press, comprising:
   a first positioning device mounted on the external auxiliary processing device;
   a further positioning device arranged outside of the printing press and fixed to a floor relative to the printing press, said first positioning device being engagable with said further positioning device such that the external auxiliary processing device is reproducibly positionable at an operating position in relation to the printing press; and
   a U-shaped receptacle arranged on the external auxiliary processing device and a cylindrical bolt arranged on the floor in relation to said further positioning device, wherein said cylindrical bolt is receivable in said U-shaped receptacle for aligning said first positioning device relative to said further positioning device.

* * * * *